June 8, 1926.
R. B. ABREU
1,587,624
ACCELERATOR FOR AUTOMOBILE ENGINES
Filed Nov. 15, 1924
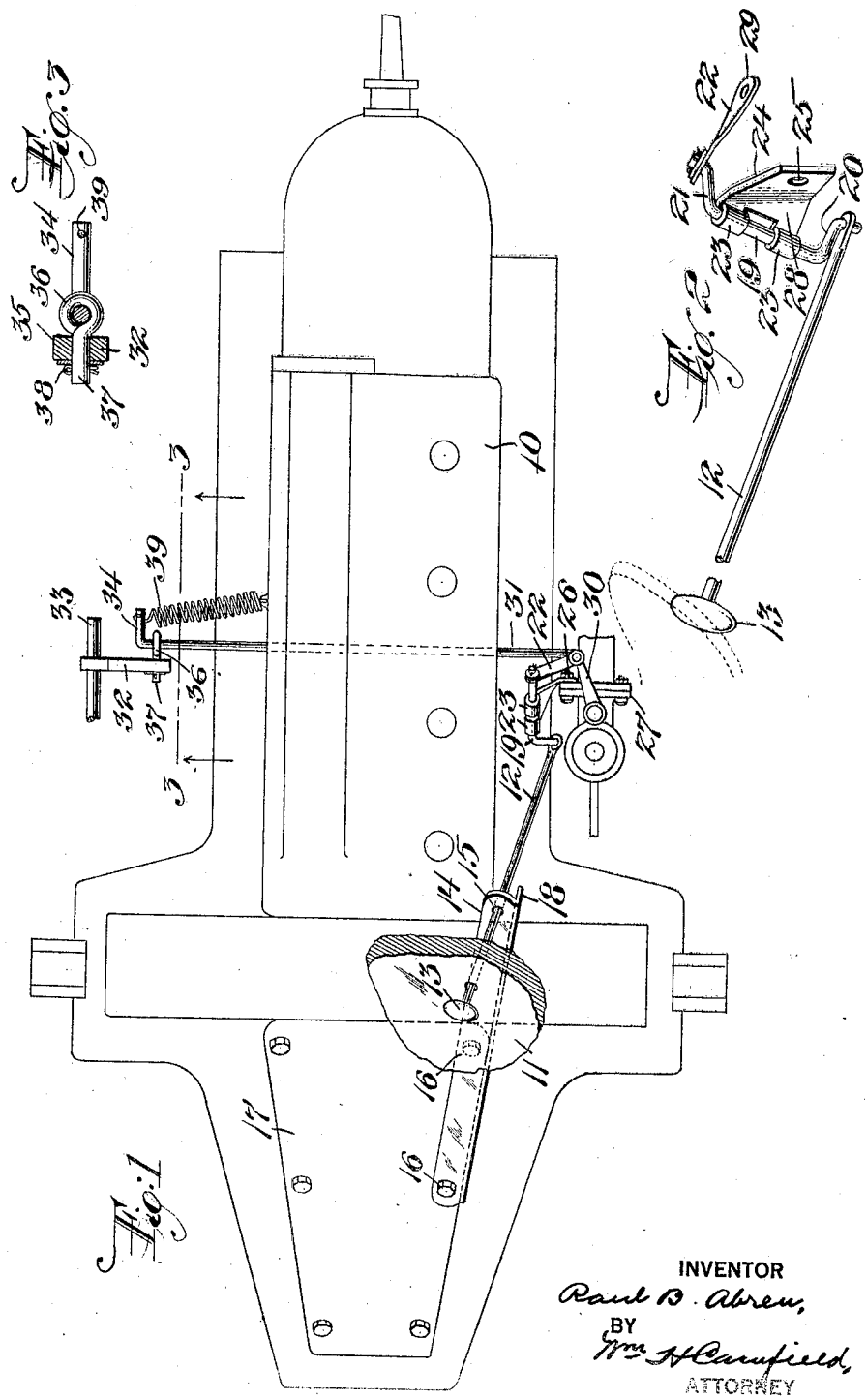

Patented June 8, 1926.

1,587,624

UNITED STATES PATENT OFFICE.

RAUL B. ABREU, OF NEWARK, NEW JERSEY.

ACCELERATOR FOR AUTOMOBILE ENGINES.

Application filed November 15, 1924. Serial No. 750,118.

This invention relates to an improved accelerator for automobile engines and is particularly adapted for use in a Ford car and is of that type which provides for a movement of the throttle lever of the carburetor to provide more fuel and thus accelerate the engine which, when released, returns the throttle lever back to the position which is occupied through its control by the throttle rod on the steering wheel.

The invention comprises a structure which is quickly secured to the engine and which is supported by the engine and the carburetor and which does not interfere in any way with the normal control of the lever on the carburetor by the usual handle on the steering wheel.

The invention is illustrated in the accompanying drawing in which Figure 1 is a top view of an automobile engine and part of the dash board showing my attachment in place. Figure 2 is a perspective view of the accelerator rod and its attachment to the carburetor and Figure 3 is an enlarged section on line 3—3 in Figure 1.

In the drawings, 10 indicates the automobile engine and 11 is the dash board which is the preferred position for the end of the accelerator rod. The accelerator rod is shown at 12 and the end that projects through the dash board is provided with a foot piece 13.

To hold the accelerator rod 12 in position, I provide a strip 14 which has a hole 15 through which the rod 12 slides, the strip 14 having perforations to receive the bolts 16 on all Ford cars which are used for holding the transmission cover 17 in position. The flange 18 of the strip 14 assists in bracing the strip 14. The accelerator rod 12 is fastened to a crank 19, one arm 20 of the crank being secured to the end of the rod 12 and the other arm 21 of the crank 19 having pivotally connected thereto a link 22.

The crank 19 is rotatably supported in knuckles 23 of the bracket 24 which bracket comprises a plate which has a hole 25 through which one of the bolts 26, by means of which the manifold and the carburetor are secured together, passes, and by means of which the bracket is clamped in position. The part of the bracket that rests against the coupling 27 is at an angle to the knuckle 23 of the bracket so that the crank 19 is inclined which permits a positive direct action between the inclined rod 12 and the inclined crank and the link 22 is twisted so that its end 29 lays flat on the throttle lever 30 of the carburetor to which throttle lever 30 of the carburetor the link 22 is connected.

It will be evident that when the foot piece 13 is pressed the parts above described will be moved so that the throttle lever 30 is swung in the direction of the arrow in Figure 1 to open it to increase the amount of fuel supplied to the engine.

The bar 31 which extends across the engine passing through an opening in Ford cars is of the usual type of Ford bar and the arm 32 on the throttle rod 33 is also of the usual type but instead of passing the lateral end 34 of the bar 31 through the hole 35 in the end of the arm 32, I remove it and turn it around the other way and install an eye 36 in the hole 35 and place the bar 31 through the eye so that it rides freely therein, the eye having its stud 37 secured in place by any means such as the cotter pin 38.

The inner extension 34 of the bar 31 is connected by a spring 39 to the engine or any other fixed support so that the bar 31 will be returned to closed position as far as the eye 36 will allow it to move. It will be seen from this that through the ordinary operation from the steering wheel of the throttle rod 33 the carburetor can be operated as usual since the eye 36 will pull the bar 31 and the lever 30 to any position desired, but for a temporary acceleration, the rod 12 is pushed through the crank 19 and the line 22. The lever 30 can be moved still further toward an open position as the bar 31 slides freely through the eye 36. On the release of the accelerator rod 12 all the connected parts return to the position originally established by the throttle rod since the extension 34 is stopped by the eye 36 at such adjusted position.

I claim:

In an accelerator device for automobile engines, a bracket comprising a plate with a hole therein for attachment to a bolt and having a knuckle at one edge the knuckle being inclined to the plane of the plate, a crank mounted in the knuckle, a link connected to one end of the crank and secured to the lever of a carburetor, an accelerator rod secured to the other end of the crank, and a lost motion connection between the lever of the carburetor and the throttle lever of the automobile.

In testimony that I claim the foregoing, I have hereto set my hand, this 26th day of September, 1924.

RAUL B. ABREU.